(12) United States Patent
Viswanathan et al.

(10) Patent No.: US 11,451,437 B2
(45) Date of Patent: Sep. 20, 2022

(54) SYSTEMS AND METHODS FOR AUTOMATICALLY PROVISIONING SMART DEVICES

(71) Applicant: Verizon Patent and Licensing Inc., Basking Ridge, NJ (US)

(72) Inventors: Harsha Viswanathan, New York, NY (US); Sambit Mishra, Fremont, CA (US); Nick G. Suizo, San Jose, CA (US); Maryam Seraj, Santa Clara, CA (US); Shin-li Cecily Liu, Mountain View, CA (US); Kent Ryhorchuk, Portola Valley, CA (US); Scott Tillman, Sunnyvale, CA (US); David L. Tucker, Saratoga, CA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

(21) Appl. No.: 16/947,313

(22) Filed: Jul. 28, 2020

(65) Prior Publication Data
US 2022/0006692 A1 Jan. 6, 2022

Related U.S. Application Data

(60) Provisional application No. 63/046,809, filed on Jul. 1, 2020.

(51) Int. Cl.
*H05B 47/19* (2020.01)
*H04L 12/66* (2006.01)
*H04W 4/14* (2009.01)
*H04L 41/0806* (2022.01)
*H04L 41/0893* (2022.01)

(52) U.S. Cl.
CPC ......... *H04L 41/0806* (2013.01); *H04L 12/66* (2013.01); *H04L 41/0893* (2013.01); *H04W 4/14* (2013.01); *H05B 47/19* (2020.01)

(58) Field of Classification Search
None
See application file for complete search history.

(56) References Cited

U.S. PATENT DOCUMENTS

| | | | |
|---|---|---|---|
| 2013/0211546 A1* | 8/2013 | Lawson | H04L 67/16 700/9 |
| 2015/0063164 A1* | 3/2015 | Hemphill | H04W 8/26 370/254 |
| 2015/0076989 A1* | 3/2015 | Walma | H05B 47/11 315/149 |
| 2016/0323457 A1* | 11/2016 | Isomäki | H04M 11/007 |
| 2018/0091506 A1* | 3/2018 | Chow | G06Q 20/085 |
| 2019/0394858 A1* | 12/2019 | Lal | H04L 12/2818 |

* cited by examiner

*Primary Examiner* — Mohamed Ibrahim

(57) ABSTRACT

A system may provision a smart device to allow the smart device to communicate using a network and use at least one service of a management platform. A device identifier of the smart device may be stored in a data store accessible to the management platform. The smart device may send a message to the management platform that includes the device identifier, and in some implementations other information such as location information. The management platform may determine that the smart device has been provisioned, for example based on the device identifier or other information, and provide a service to the smart device from the management platform.

20 Claims, 12 Drawing Sheets

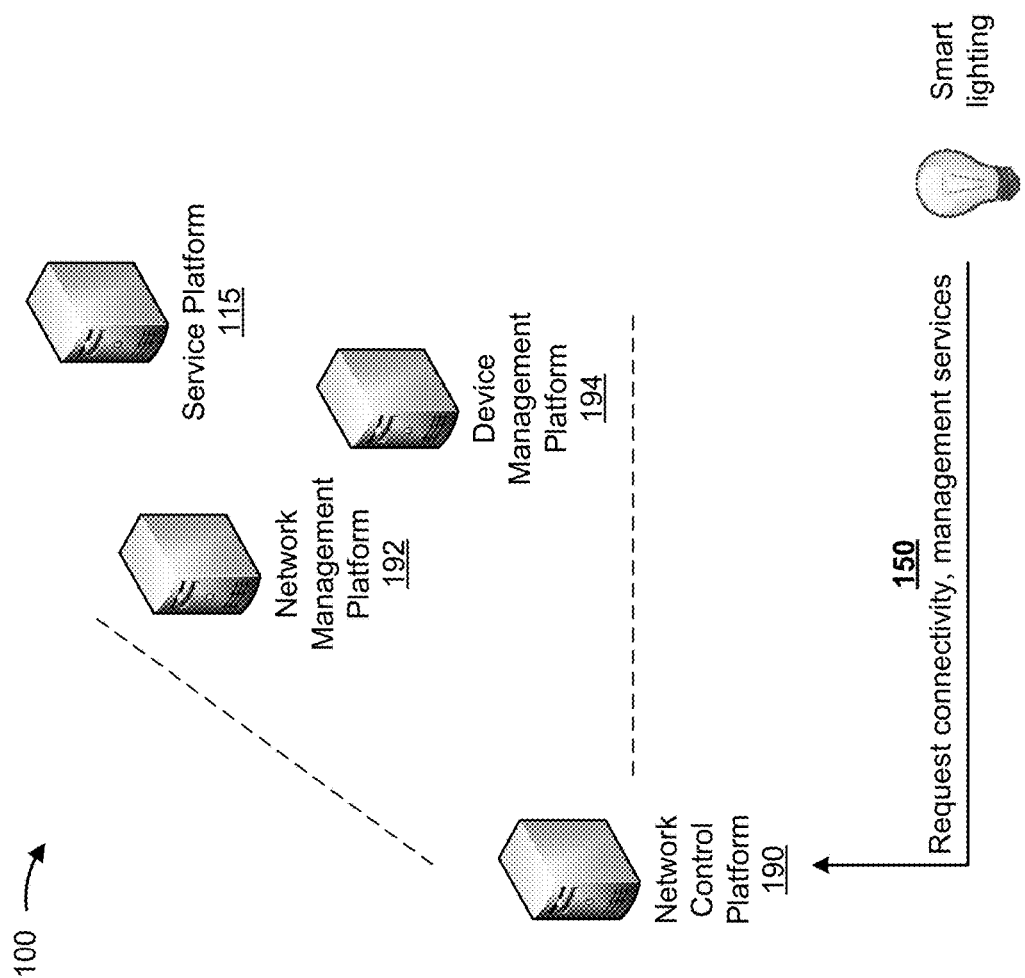

SYSTEMS AND METHODS FOR AUTOMATICALLY PROVISIONING SMART DEVICES

RELATED APPLICATION

This application claims priority to U.S. Provisional Patent Application No. 63/046,809, filed on Jul. 1, 2020, and entitled "SYSTEMS AND METHODS FOR AUTOMATICALLY PROVISIONING SMART DEVICES," the content of which is incorporated by reference herein in its entirety.

BACKGROUND

The expansion of networking capabilities to more devices (sometimes referred to as the "Internet of Things" or IoT), has allowed for the expansion of functional capabilities to more devices that were previously single-purpose and/or manually controlled. Devices that include network connectivity and enhanced functionality are sometimes referred to as "smart" devices. One such application of "smart" networking capabilities is in lighting applications. "Smart" lighting applications enable management of lighting to, for example, optimize energy use, reduce maintenance costs, improve safety, and/or the like. Deployment of "smart" facilities, however, is challenging due to costs and logistics associated with equipment procurement, installation, connectivity activation, network security and management activities, among other concerns.

BRIEF DESCRIPTION OF THE DRAWINGS

FIGS. 1A-1I are diagrams of one or more example implementations described herein.

DETAILED DESCRIPTION OF PREFERRED EMBODIMENTS

Figure 1A:
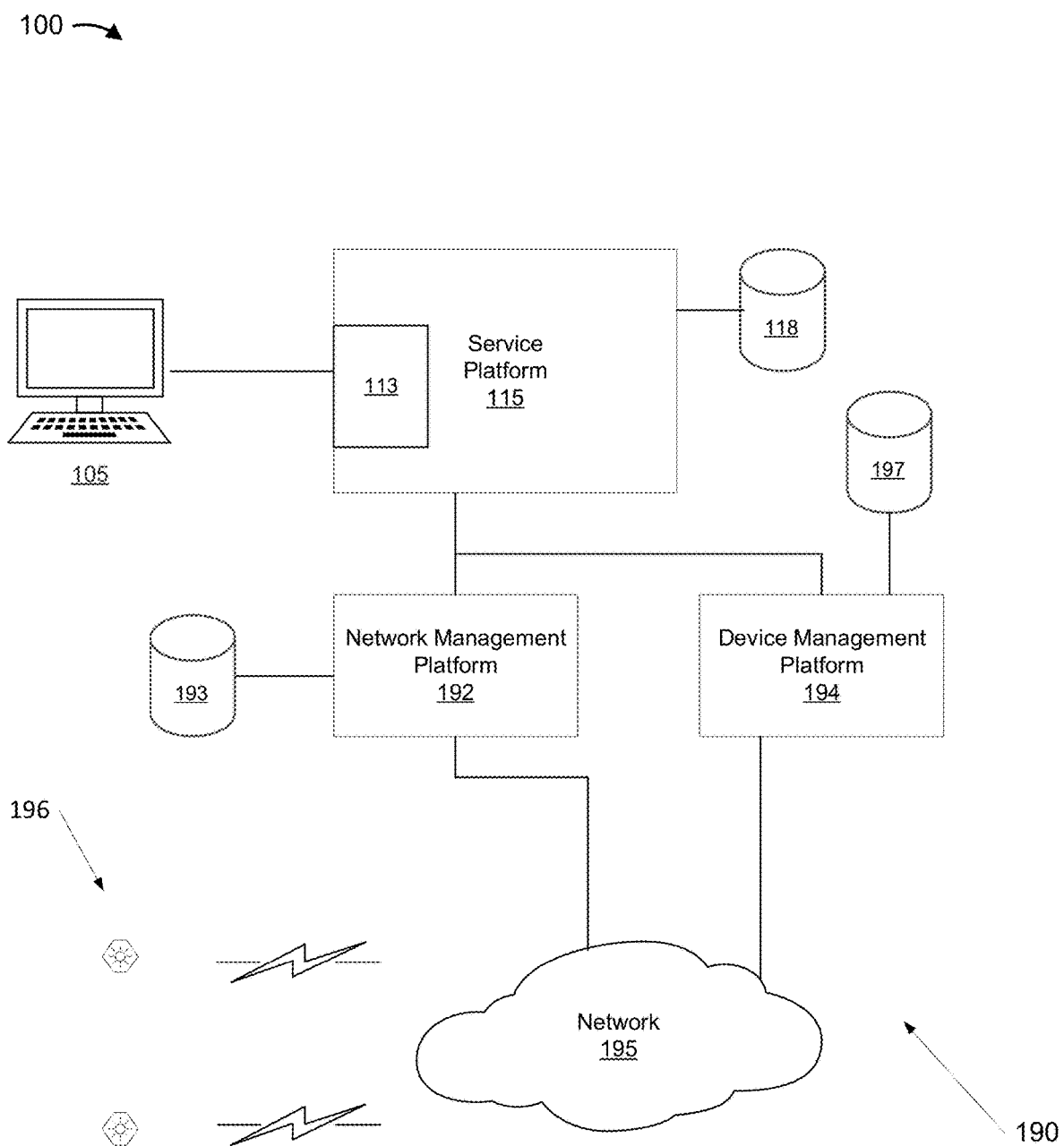

The following detailed description of example implementations refers to the accompanying drawings. The same reference numbers in different drawings may identify the same or similar elements.

Deployment of "smart" facilities is typically a time-consuming and resource intensive process, particularly for large scale deployments. For example, consider an example of deploying one hundred smart lighting devices across a building complex which is served by a network service provider. The installer will need to procure the smart lighting devices from a manufacturer. The manufacturer will typically not be the same entity as the network service provider, but will need to configure the devices to be able to communicate over the network service provider's communications network. The network service provider will need to ensure that only secured and well-functioning devices are connected to its network, that each device is uniquely addressable over the network, and that certain characteristics associated with the device are known (such as its geographic location, the entity that is responsible for the device, and the like). Network service providers sometimes refer to the process of enabling a smart device to use network services as "provisioning."

Typically, an installer of the smart device must utilize an identifier (e.g., a serial number and/or the like) affixed to or embedded in the device to manually request provisioning of the device to obtain service from the network service provider. Manual provisioning may involve contacting the network service provider to indicate the identifier and provide further characteristics of the device (such as its geographic location and owner information). The network service provider would then need to verify that the identifier matches its provisioning information before service may be provided, in order to prevent security breaches from allowing unauthorized devices access to the network, proper configuration of systems that will be used to the service the device, proper allocation of services usage, and the like. This is a tedious and time-consuming process, especially when hundreds (or thousands) of smart devices are being installed by the installer, possibly over a large geographic area, and is prone to data entry errors. Such large installations are becoming more common with the expansion of 4G and 5G wireless services that allow for direct communication with smart devices over larger distances than typical "local area" networking technologies (e.g., WiFi, ZigBee). Further complexity is introduced when the network service provider is providing services to smart devices associated with multiple entities, and each entity may have different service requirements or have subscribed for different services associated with their smart devices.

Thus, current installations of smart devices waste computing resources (e.g., processing resources, memory resources, and/or the like), communication resources, networking resources, human resources and/or the like, for example, from the inefficiencies associated with manually reporting smart device installation information, identifying incorrectly input smart device installation information, correcting the incorrectly input smart device installation information, configuring service requirements and/or the like, and the resulting is delay in enabling the operation of smart devices.

Some implementations described herein provide a system that automatically provisions different types of IoT ("smart") devices, such that upon installation of the IoT devices they may be automatically provided the desired services. The system may receive, from a user device associated with an entity that desires a deployment of smart devices, a request for a type of smart device (such as a smart lighting device). The system may provide, to a system associated with a manufacturer of the smart device, a request that includes data identifying the type of smart device and entity information that is associated with the entity. The system may receive, from the system associated with the manufacturer of the smart device, device information associated with the smart device that will be (or has been) provided in response to the request. The device information may include a device identifier that may be used to identify the provided smart device. The device information may be provided, for example, once the manufacturer has identified the smart device(s) that will be sent to fulfill the request made by the entity.

The system may provide the device information and entity information to one or more components of a network control platform, such that the network control platform may provision a network management component to allow the smart device to communicate using a network and a device management component to provide services to the smart device.

In some implementations, one component of the network control platform (a network management platform) manages the connectivity of smart devices using the network, and another component of the network control platforms (a device management platform) manages the services provided to smart devices. The network management platform may provision the smart device based on the device identifier such that, upon receiving a message from the smart device to communicate over the network (e.g., a registration request message), the network management platform may confirm authorization and provide connectivity. The device management platform may provision the smart device based on the device identifier and the entity information such that, upon receiving a communication from the smart device including the device identifier, the device management platform may confirm authorization and provide one or more device management services, such as requesting/providing configuration data, requesting device operational data or activating a device capability. In some implementations, the device management platform may also receive location information for the smart device, and may use the location information to associate the smart device with the location information, verify that the smart device is installed in the desired location, associate the smart device with other fixtures that geographically correspond with location information, or other actions.

A specific example of such a system can be described in the context of a smart lighting deployment that will be serviced by a wireless network and a lighting management platform. For example, the system may receive, from a user device associated with an entity that desires a deployment of a smart lighting device, a request for a type of smart lighting device, and may provide, to a system associated with a manufacturer of the smart lighting device, a request that includes data identifying the type of smart lighting device and data identifying the entity. The system may receive, from the system associated with the manufacturer of the smart lighting device, device information associated with the smart lighting device and the data identifying the entity (for example, once the manufacturer has identified a specific smart lighting device that will be used to fulfill the request). The device information may include a device identifier that can be used to identify the smart lighting device. The system may provide the device information and entity information to a network management platform and a lighting management platform. The network management platform may provision the smart lighting device based on the device identifier such that upon receiving a request from the smart lighting device to communicate over the wireless network (e.g., a registration request), the network management platform may confirm authorization and provide connectivity. The lighting management platform may provision the smart lighting device based on the device identifier and entity identification such that upon receiving a message from the smart lighting device, the lighting management platform may confirm authorization and provide lighting management services. The lighting management platform may also receive location information for the lighting device, and may use the location information to associate the lighting device with the location information, verify that the lighting device is installed in the desired location, associate the lighting device with other fixtures that geographically correspond with location information, or other actions.

In this way, the system automatically provisions different types of smart devices without manual intervention. The system enables smart devices to be provisioned automatically so that large quantities of smart devices can be quickly and easily installed, provisioned, and/or the like. Provisioning may occur immediately upon installation, so that installers may be able to confirm operation immediately while on site, or may occur at a later time, for example, when power is applied to the installed smart devices. Thus, the system conserves computing resources, communication resources, networking resources, human resources and/or the like that would otherwise be wasted in manually inputting smart device information, identifying and correcting incorrectly input smart device information, configuring services to provide to the smart devices, and/or the like.

FIGS. 1A-1I are diagrams of one or more example implementations described herein. The example implementations will be described in connection with an example of the provisioning of smart devices 196 (e.g., smart lighting devices) to communicate over network 195 (for example, a wireless network) with a network control platform 190. As further described below, the network control platform 190 may include components that provide network management and device management services.

As shown in FIG. 1A, a user device 105 may be associated with an entity that desires a deployment of smart devices, and in this example, smart lighting devices 196. User device 105 may include a mobile device, a computer, a telephone, and/or the like that the entity (e.g., through a user associated with the entity) may utilize to interact with system 100. Service platform 115 may include or be associated with a platform that automatically provisions different types of smart devices (e.g., requested by the entity via user device 105) as described herein. Service platform 115 may provide a user interface 113 that is accessible to user device 105. Service platform 115 may maintain entity information associated with the entity, such that service platform 115 may provide, through user interface 113, services that the entity has subscribed to with respect to the smart devices associated with the entity. Entity information may include information associated with the entity, such as an entity name, one or more entity identifiers (e.g., account numbers), and/or one or more identifiers of smart device deployments (e.g., location identifiers, geographic location data, etc.). Entity information may also include information identifying services to which the entity has subscribed that are provided by the network control platform 190.

User interface 113 may provide facilities to allow an entity to provide information associated with the smart devices to be deployed. The provided information may include device information associated with the smart devices. The device information may include one or more smart device identifiers associated with each smart device to be deployed. The one or more smart device identifiers may include unique identifiers that allow the individual devices to be identified, such as international mobile equipment identity (IMEI) numbers, serial numbers, MAC addresses, and/or the like, as well as other identifiers associated with the smart devices (e.g., model numbers, device types, version numbers, etc.). The device information provided through user device 105 may be associated with the entity in the service platform 115, such that the entity may manage the smart devices through user interface 113. The association may be through a data structure 118 (e.g., a database, a table, a list, and/or the like) associated with service platform 115 where entity information, request identifiers, device information, and/or the like may be stored. The data structure may also include service information, which may include information such as how to provision the type of smart device with a device management platform (described below), what services are to be provided to the smart lighting device, and/or the like. In some embodiments, service information may be associated with a specific deployment of smart devices (e.g., a campus, a park, a building, a geographic coordinate), a specific entity that has subscribed to the service, or a type of smart device that is capable of using the service (e.g., video recording for cameras, temperature measurement for environmental sensors, light on/off actuation timers for lighting devices, etc.)

In some implementations, the user interface 113 may also allow an entity to provide provisioning information associated with the smart devices to be deployed. Provisioning information may include information such as the services that should be provisioned for the smart device(s) and how the services should be configured (e.g., bandwidth, quality of service, timing, geographies, locations, and the like). In some implementations, the provisioning information may include geographic location information (e.g., geographic coordinate data) associated with each smart device indicating a desired location for where the device is to be installed.

Figure 1B:
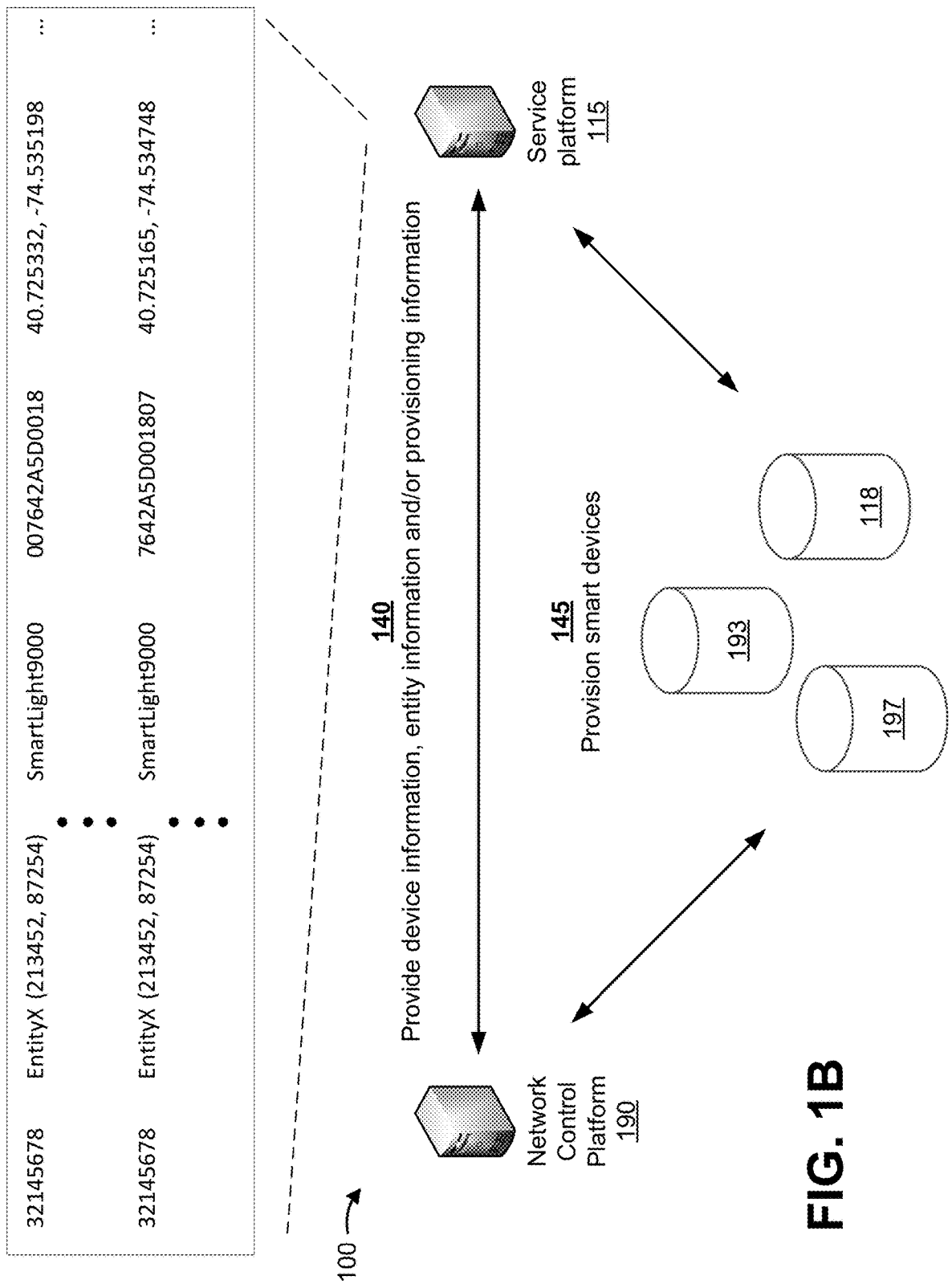

As shown in FIG. 1B, the service platform 115 may provide the device information, entity information and/or provisioning information to network control platform 190. For example, service platform 115 may provide the device information and entity information according to the service information identifying how to provision the smart device(s) for the desired services. In some implementations, the device information may include a unique device identifier (e.g., an IMEI, a MAC address, a serial number), and/or other identifiers of the smart devices. The entity information may include an identifier associated with the entity (e.g., one or more account numbers). In some implementations, service platform 115 may also provide to network control platform 190 service provisioning information associated with the device information and/or entity information—for example, services that should be provisioned for the smart device(s) and how the services should be configured (e.g., bandwidth, quality of service, timing, geographies, locations, and the like). The provisioning information may include geographic location information (e.g., geographic coordinate data) associated with each smart device indicating a location where the device is installed (or a desired location at which the device should be installed). In the example provided in FIG. 1B, geographic coordinate data in the form of latitude-longitude pairs is provided for individual devices.

In some implementations, provisioning information may not be needed. For example, network control platform 190 may already include provisioning rules associated with smart devices and/or entities, and may apply those rules based on the device information and/or the entity information. In such cases, the network management platform 190 may perform provisioning of each smart device based on the received device information and/or entity information.

As shown in FIG. 1A, in some implementations, the network control platform 190 may be implemented as multiple components, such as a network management platform 192 and a device management platform 194, where the network management platform 192 performs connectivity management of smart devices and device management platform 194 performs management of services provided to smart devices. In some environments it may be desirable to combine the network management and device management capabilities in a single platform, but in other environments such a segregation of responsibilities may be beneficial, such as where a network may accommodate multiple device types and connection types, and device management services are focused on a subset of devices with certain capabilities and requirements (such as smart lighting devices). For example, a network may be managed using a set of existing network elements configured to perform network management actions, and separating device management services may be better for development, deployment, maintenance, and operations. As such, network management platform 192 may comprise one or more network elements that may be used to manage network connections, and depending on the network technology used, may include LTE components (e.g., eNodeBs, mobility management entities (MMEs), home subscriber servers (HSS), packet gateways (PGWs), policy charging rule functions (PCRFs), etc.) and/or 5G components (e.g., gNodeBs, authentication server functions (AUSFs), access and mobility functions (AMFs), session management functions (SMFs), policy control functions (PCFs), unified data management (UDM), etc.). Device management platform 194 may include one or more servers connected to network 195.

In such implementations, the device information, entity information and/or provisioning information may be provided to both network management platform 192 and device management platform 194 as needed. For example, the device information, entity information and/or provisioning information may be provided to device management platform 194, and device management platform 194 may provide the device information, entity information and/or provisioning information to network management platform 192. In some implementations, the device information, entity information and/or provisioning information may be provided to network management platform 192 and network management platform 192 may provide the device information, entity information and/or provisioning information to device management platform 194. In some implementations, the device information, entity information and/or provisioning information may be provided to both network management platform 192 and device management platform 194 separately. In any case, entity information and provisioning information may be omitted if not needed (for example, if entity information or provisioning rules already exist in the components of network control platform 190).

As shown in FIG. 1B, and by reference 145, network control platform 190 may provision the smart devices. Provisioning may include several actions depending on the nature of the services and components involved. For example, network control platform 190 (e.g., network management platform 192) may enable network access for each smart device identified in the device information. In some implementations, network access may include provisioning one or more device identifiers (e.g., IMEI, MAC address) in network device data stores 193 such that future requests for connectivity will be fulfilled according to the information in the network device data stores 193. Such network device data stores 193 may include network elements such as a home subscriber server (HSS), a user profile server function (UPSF), a policy and charging rules function (PCRF), a unified data management (UDM) function, or other user/device data repositories that are accessible to network management components. In some implementations, device identifiers may be associated with network identifiers, such as network addresses, international mobile subscriber identity (IMSI) numbers, mobile directory numbers (MDNs), mobile station international subscriber directory numbers (MSISDNs), IP addresses, and the like.

Provisioning may include establishing the communication path by which the smart device may communicate with device management components (e.g., device management platform 194). For example, the network control platform 190 (e.g., network management platform 192) may indicate in the network device data stores 193 one or more identifiers for network elements that provide access to device management components and/or connection methods. One example would be identifying a device management network address associated with a network interface facility that will be providing access to the components implementing device management services. Future communications directed to the device management network address would then be forwarded to the device management platform according to the communications methods of the network interface facility. The network interface facility may be implemented using one or more network elements such as routers, firewalls and gateways—for example, a packet network gateway (PGW), a short messaging service (SMS) gateway, a user plane function (UPF) endpoint, and the like. Network connection methods could include SMS, IP/UDP/TCP, and the like. Provisioning may also include associating the device with entity account information, such that network policies may be enforced and network usage information may be measured.

Provisioning may also include provisioning the smart device in a device management component (such as a device management platform 194). In some implementations, the device management component may use device information, entity information and/or provisioning information to provision smart devices. For example, device identifiers and entity identifiers may be stored in device management data stores 197 accessible to the device management components. Device identifiers may include the device identifiers noted above. Smart devices may be associated with entities matching the entity information provided during provisioning, such that an entity (with proper credentials) may manage the smart devices associated with the entity. The device management component may further apply provisioning rules that enable one or more services provided by the device management component to be available for the provisioned smart devices. Provisioning rules may be based on a smart device type, entity information, deployment information, and the like. For example, a smart lighting device for a certain entity managing a university campus may be provisioned to be associated with the entity and an account associated with the university campus, and provisioned for use of services that control activation of the light source and the like, for which the entity has subscribed. In some implementations, provisioning information may include geographic location data indicating the desired location for the smart devices, and the device management component may use provisioning rules to ensure that installed smart devices are in compliance with the desired locations. Provisioning rules may be provided as provisioning information provided by service platform 115 or predefined in device management components, as noted above.

In some implementations, the device management component (e.g., device management platform 194) may query the network management component (e.g., network management platform 192) to obtain network identifiers associated with the provisioned smart devices. For example, the device management component may provide one or more device identifiers to the network management component to obtain network identifiers assigned to the provisioned smart devices when they have been provisioned for network connectivity. The network identifiers may be as noted above, such as an MDN, MSISDN, IMSI, IMEI, IP Address, or other identifier. Network identifiers may be preferred for message transmissions.

After smart devices have been provisioned in network control platform 190, the smart devices may be installed. For example, the smart devices may be placed in their desired physical locations. As shown in FIG. 1C, and reference 150, the smart devices may then request services. For example, the smart devices may be powered on, such that they attempt to make initial connection to the network and the device management component. In some implementations, the smart devices will attempt to register to use network 195 using the applicable network registration process. Registration may include providing one or more device identifiers (e.g., IMEI, IMSI, MAC address) to network management components of network control platform 190. Network control platform 190 may then compare the provided device identifiers to those stored in network device data stores 193. As the smart device has been provisioned for service, the network control platform 190 will proceed to authorize the smart device for connectivity over network 195. Network control platform 190 may further provide network identifiers to the smart device (e.g., MDN, MSISDN, IP Address) and a device management network address to use for communications with the device management component (e.g., device management platform 194). If the smart device had not been provisioned for network connectivity, the network control platform 190 may reject the connection request, and the smart device would not be able to communicate with the device management component over network 195.

The smart device may further attempt to connect to the device management component (e.g., device management platform 194). For example, the smart device may send a message to the device management component using the messaging capability/format that the device is configured to use. In some implementations, the smart device may use one or more of SMS messaging, IP/UDP/TCP transmissions, or other protocols to communicate with the device management component. The smart device may use the network address(es) provided by the network control platform 190 for communication with the device management component in order to direct the message to the device management component. The message may include the network identifier assigned to the smart device and/or device identifiers associated with the smart device. For example, the message may include an MDN/MSISDN assigned to the smart device. The message may traverse network 195, egress through a network interface facility and be delivered to the device control component. The device control component may then use the network identifiers/device identifiers in the message to query the device management data stores 197 to determine if the device has been provisioned for service. When the network identifier(s)/device identifier(s) are found in the device management data stores 197, the device management component may record that the smart device has made a successful initial connection, and may perform subsequent communications to, for example, request/provide configuration information, collect operational data from the device (e.g., sensor measurements, video images, etc.), activate a device capability (e.g, turn on an irrigation system, display a message, etc), perform software updates or other maintenance, and so forth. If the network identifier(s)/device identifier(s) are not found in the device management data stores 197, the device management component may reject or ignore the message. In some implementations, the device management component may perform further actions as part of the provisioning process, such as confirming geographic location data and correlating smart devices with fixtures, as further described below.

Once provisioned, the device management component may provide services to smart devices according to the type of smart device and the services to which the entity associated with the smart device has subscribed. Services may be managed through an interface to the device management component, such that users may view smart device information as collected by the device management component. In the example of the management of smart lighting devices, the device management component may provide a service that monitors smart lighting devices for their status, allows for actuation of the lighting element through scheduling or manual operation, and other similar services. The device management component may allow an entity associated with the smart devices to view those smart devices that have been provisioned, as well as smart devices that have been provisioned but not yet connected, and any associated information concerning its smart devices (e.g., operational status, last communication time, location, etc.). This information may be useful to determine situations where smart devices are expected to be connected according to the provisioning information but as yet have not been able to connect (indicating an issue requiring attention).

Figure 1D:
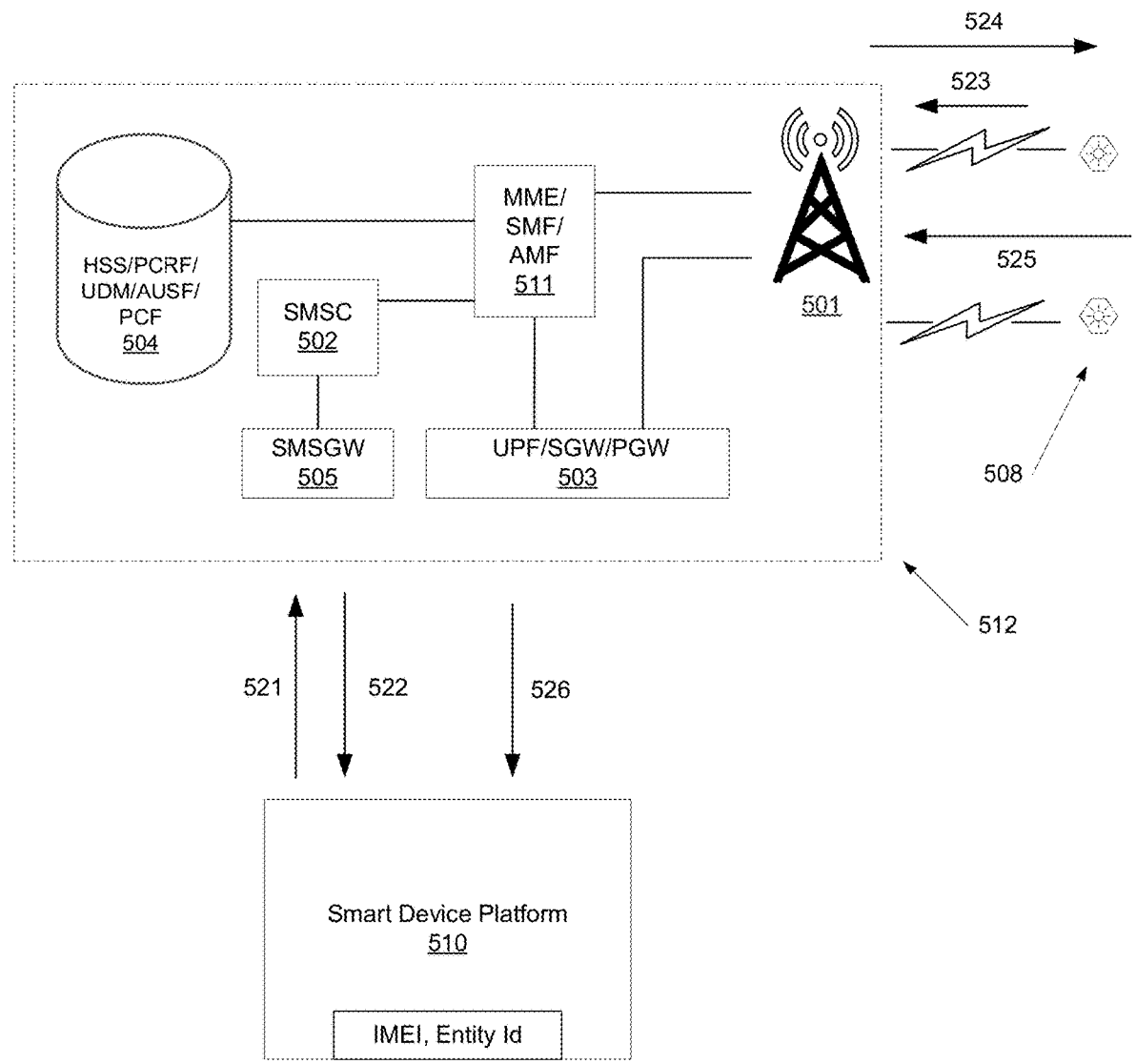

FIG. 1D provides a further example of a smart device provisioning system. FIG. 1D illustrates a provisioning system that uses elements of a 3GPP LTE/5G network to implement components of a service platform, network control platform and network that provides connectivity and services to example smart devices 508 (e.g., smart lighting devices). Smart devices 508 may each be assigned a unique IMEI by the device manufacturer, and may include a communications facility that allows for communications over an LTE and/or 5G communications network. The communications facility may include a secure element that stores the IMEI and/or other device identifiers.

A smart device platform 510 may store device information—including the device identifiers (e.g., IMEIs)—of smart devices 508. The smart device platform 510 may also store entity information of an entity that intends to have the smart devices installed and managed under their subscription for IoT services. The smart device platform 510 may instruct (521) a network facility complex 512 to provision the smart devices 508 for network connectivity. The network facility complex 512 may include components of a 3GPP 4G/5G network, such as nodeBs 501, user plane function/SGW/PGW 503, HSS/UDF/PCF/PCRF 504, mobility management entity (MME)/access and mobility function (AMF)/session management function (SMF) 511, short messing server controller (SMSC) 502, and short messaging service gateway (SMSGW) 505, among others. The instruction to provision the smart devices 508 for network connectivity may include the device identifiers (e.g., IMEIs). The network facility complex 512 may use the IMEIs to register the smart devices 508 (e.g., in data stores 504), and provide mobile device numbers (MDNs) associated with the IMEIs. In some implementations, the MDNs may be assigned by the smart device platform 510 and provided to the network facilities complex 512 with the IMEIs. In some implementations, the MDNs assigned to smart devices 508 may be provided (522) to smart device platform 510. Smart device platform 510 may provision the smart devices 508, for example, by storing the MDNs, associating the MDNs with the entity records associated with the entity information and associating the MDNs with services available in the smart device platform 510, such as lighting control, power usage monitoring, outage detection, and the like. As noted above, in some implementations, additional provisioning information may also be provided to smart device platform 510, such as service information, geographic location data, and the like.

Upon deployment of the smart devices 508 and power on, the smart devices initially attempt to register (523) to obtain connectivity through network facility complex 512. For example, the smart devices 508 provide their IMEIs as part of a registration process with network facility complex 512. Because the smart devices 508 have been previously provisioned, the IMEIs for smart devices 508 are present (e.g., in data stores 504), and thus the network facility complex 512 allows the smart devices 508 to register and obtain connectivity. The network facilities complex 512 may also provide (524) network identifiers such as MDNs and IP Addresses associated with each smart device 508, and device management network addresses for interface elements that permit access to smart device platform 510. For example, the network facilities complex may provide an access point name (APN) for a gateway (e.g., PGW 503) that provides access to service platform 510. Alternatively or additionally, the network facilities complex 512 may provide an SMS application to person (A2P) address for the smart device platform 510 or other SMS address, such that the smart devices 508 may send messages to smart device platform 507 using SMS GW 505.

Smart devices 508 may then initiate communication with smart device platform 510, for example, by sending an initial message (525) to the device management network address associated with smart device platform 510. The initial message may include the MDN of the smart device 508 sending the message, as well as other information (e.g., geographic information). In some implementations, the initial message from smart devices 508 is sent using SMS, and directed by SMSC 502 to SMS gateway 505. In other implementations, the initial message may be sent using IP/UDP/TCP, for example through user plane/gateways 503. The initial message may be transmitted (526) from network facilities complex 512 to smart device platform 510. Upon receipt, smart device platform 510 compares the MDN to its provisioning information, and upon determining the MDN has been provisioned, begins device control activities, such as sending commands to smart device 508 associated with its provisioned services—for example, sending configuration commands, requesting sensor measurements, requesting stored data, requesting location data, controlling device features, and so forth. If the MDN of smart device 508 had not been pre-provisioned in the smart device platform 507, the message from smart device 508 would be rejected (e.g., discarded).

Through the provisioning platform described above in FIGS. 1A-1D, a smart device (such as a smart lighting device) may be efficiently provisioned in IoT management systems in an automated manner, avoiding issues associated with manually configuring device identifiers in multiple systems with multiple service types and timing considerations of when devices are installed and powered on.

In some embodiments, the provisioning system may further be used to collect and/or verify location information associated with smart devices. Location information may be useful for smart devices because they are typically deployed in distributed geographic areas in non-standard locations, and in some cases may not include capability to report their location. As noted above, a desired/expected geographic location of a smart device may be specified as part of the provisioning information provided to network control platform 190. For example, an expected geographic area may be provided with the device information and entity information.

In some implementations, the entity associated with the smart device may provide the geographic information separately and/or directly to the network control platform (e.g., through a user interface that permits the entity to manage the smart devices). The geographic information may constitute geographic coordinates, one or more parameters defining a geographic area (e.g., a "geofence") or geographical reference information (e.g., association with a known location or object). In some embodiments, no geographic information may be provided during provisioning until device registration (described below).

Upon installation of the smart device, its current location information may be provided. Multiple possibilities exist for providing the current location information of the smart device's location. For example, the device may be equipped with a geographic location facility (e.g. GPS), and upon power up is able to detect its location and provide this information during its initial registration with the device management component. Alternately or additionally, network management component may obtain the smart device's location using network-based location detection facilities (e.g., 4G/5G location facilities), and may provide the location information to device management component or to the smart device for it to report to the device management component. Alternatively or additionally, an installer may use a tool which sends geographic coordinates associated with the smart device to the device management component when the device is installed.

The device management component may store the device geographic information. It may also, in some embodiments, use the current device location information to verify that the smart device has been deployed in the expected location. For example, if during provisioning a geographic location/area was specified, the geographic location reported by the smart device may be compared to the previously provided expected location information, and if there is a discrepancy an action may be taken—for example, refuse connection, flag the discrepancy, notify the entity associated with the smart device, and the like. In some embodiments the device management component may associate the smart device with a known object ("fixture") or landmark that geographically corresponds to the smart device (e.g., is located in an overlapping or adjacent area). For example, for a smart lighting device, the reported current location may be compared to known lamppost fixture information, such that the smart lighting device may be associated with a specific lamppost fixture. In some implementations, the fixture information may include data identifying one or more fixtures (e.g., a fixture body, a light pole, a lamp, a reflector for directing light, an aperture, an outer shell or housing for lamp alignment and protection, an electrical ballast or power supply, and/or the like) and/or a location of the fixture. For example, the fixture data may indicate a fixture identifier and a geographic location, and the device management component may associate the smart device with the fixture identifier when the fixture location information geographically corresponds to the smart device geographic location. Alternatively, where the fixture to which the smart device is known but its location is not known, the location of the smart device may be used to identify the location of the fixture.

Figure 1E:
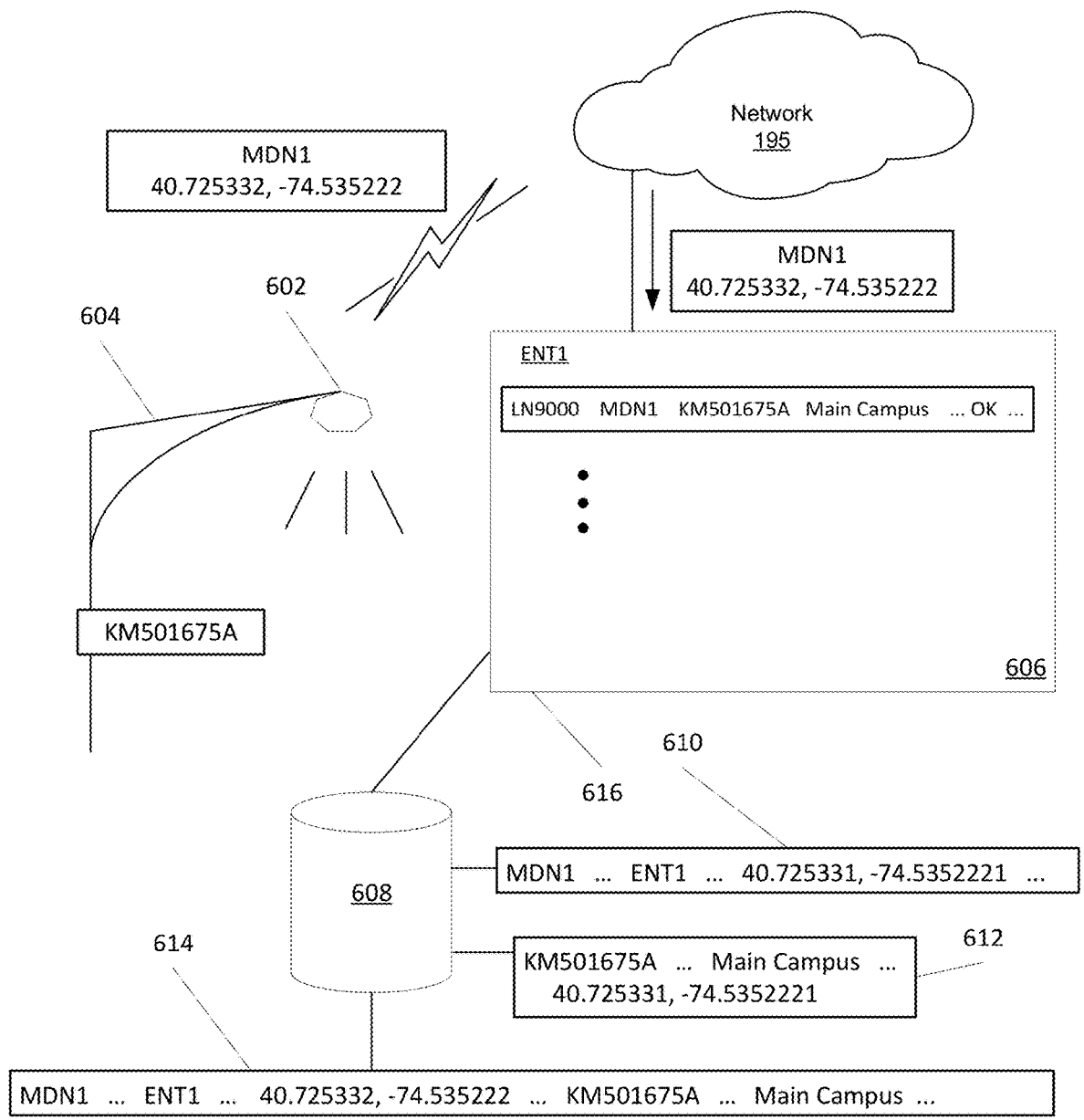
Figure 1F:
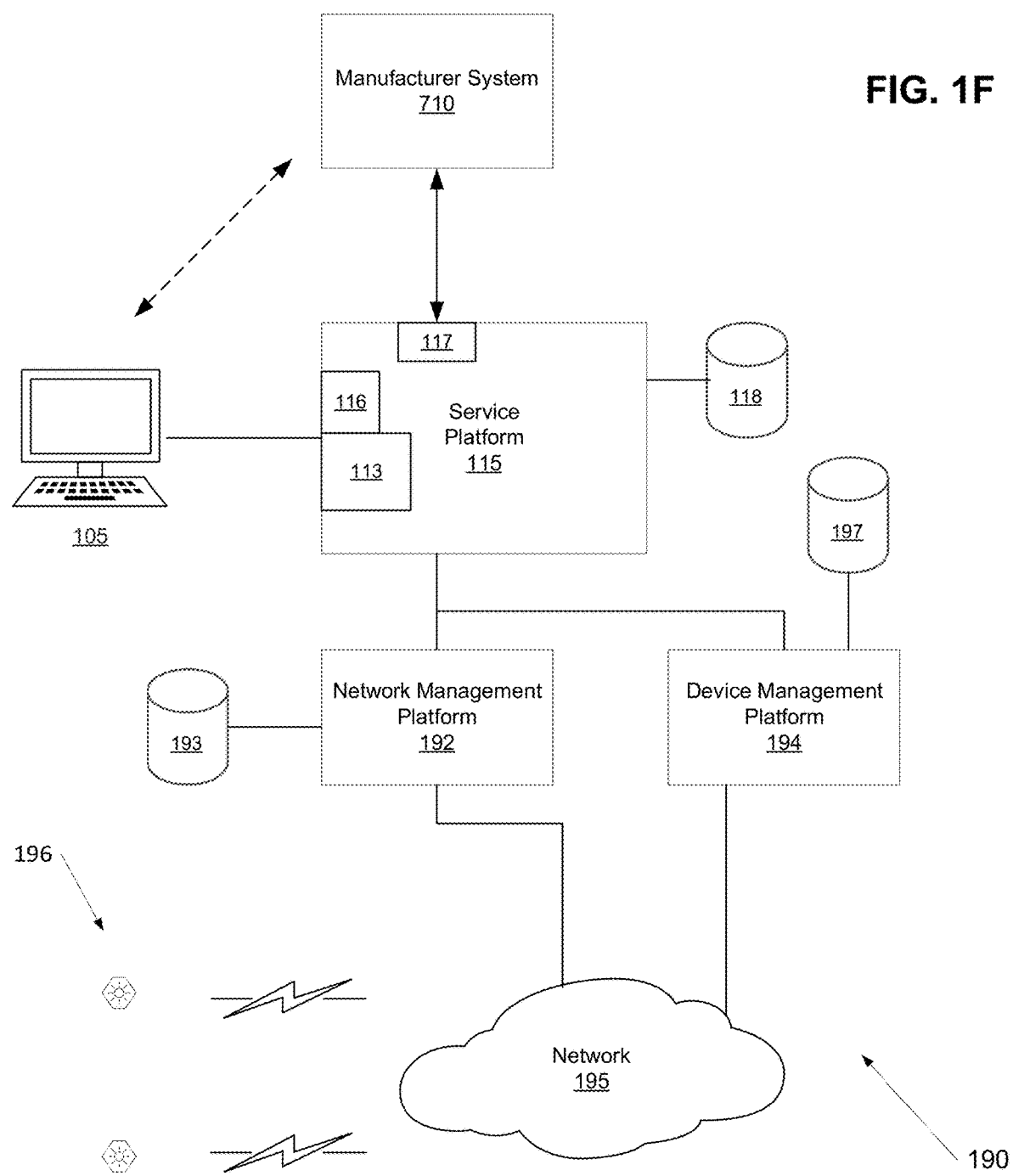
Figure 1G:
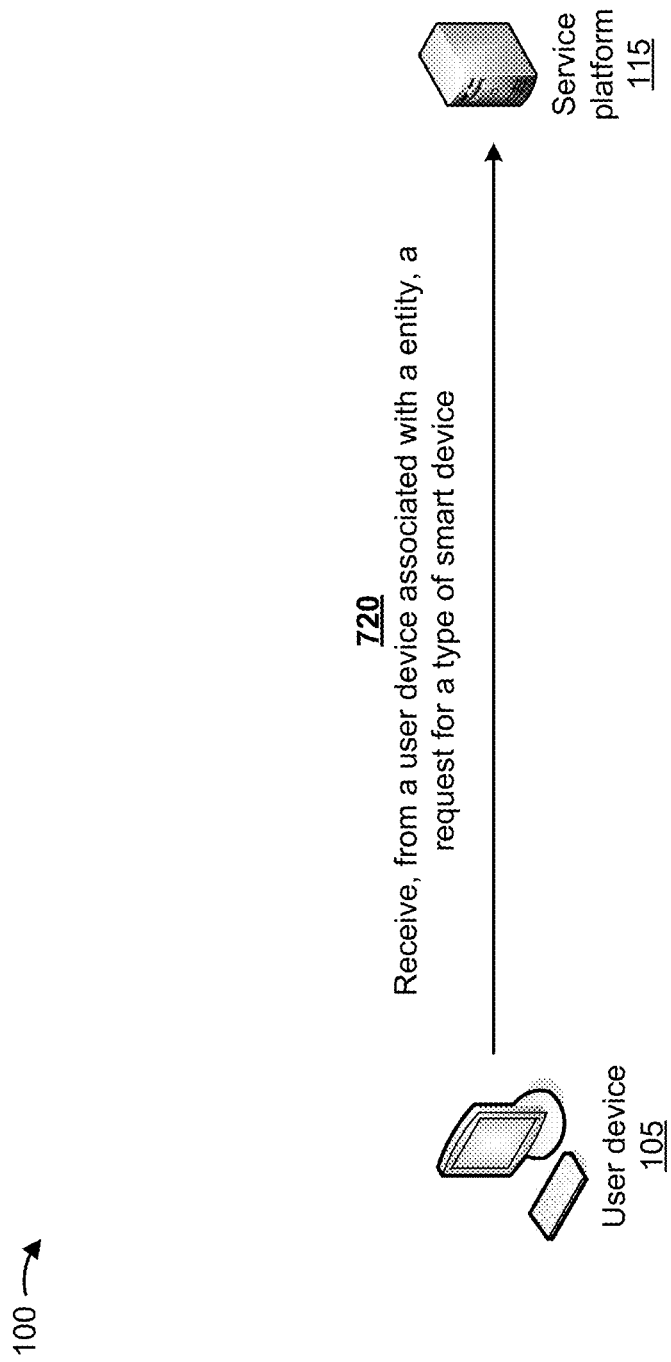

FIG. 1E illustrates an example implementation where some location capabilities are implemented. In this example, a smart lighting device 602 has been installed as an attachment to a lamppost fixture 604. Upon power up, smart lighting device 602 attempts connection to network 195 and lighting management platform 606. Smart lighting device 602 transmits its device identifier (e.g., "MDN1") as well as geographic location information (in this example, latitude-longitude coordinates "40.725332, −74.535222"). As in this example smart lighting device 602 has been previously provisioned for communication using network 195, the connection to network 195 is permitted, and the message is sent to lighting management platform 606. Lighting management platform 606 determines whether provisioning information 610 exists in its data store 608 for smart lighting device 602. In this case, provisioning information is found matching the device identifier ("MDN1") for smart lighting device 602.

In this example, the provisioning process includes a location verification step to confirm that smart lighting device 602 is reporting a current location consistent with the desired location provided in the provisioning information. Lighting management platform 606 compares the location information provided for smart lighting device 602 as part of the provisioning information 610 with the actual reported location of the smart lighting device 602. The comparison may permit a threshold amount of variation to accommodate location accuracy constraints—in this example, the variation in latitude and longitude of +/−0.000001 is considered acceptable, and therefore the reported location of smart lighting node 602—"40.725332, −74.535222"—is determined to be a match to the expected location—"40.725331, −74.5352221".

Continuing the example of FIG. 1E, lighting management platform 606 may further include a fixture mapping service that associates smart lighting devices with fixtures to which they are attached or in proximity. Lighting management platform 606 finds fixture information 612 in the data store 608 associated with the smart lighting device location—in this example, a pole ID ("KM501675A") and a campus name ("Main Campus"). In some implementations, one or more entity identifiers may be included with the fixture information so as to permit fixture association based on the entity managing the smart devices (e.g, to allow entities to specify their fixtures uniquely, specify commonly used fixtures with entity-specific identifiers, and the like). Lighting management platform 606 may then complete activation of smart lighting device 602 by populating its device record 614 with the device identifier, entity identifier, location information and determined fixture information.

As noted above, once provisioned, the device management component provides services to smart devices according to the type of smart device and the services to which the entity associated with the smart device has subscribed. Services may be managed through an interface to the device management component, such that users may view smart device information as collected by the device management component. In the example of the management of smart lighting devices, the device management component may provide a service that monitors smart lighting devices for their status and provides certain control capabilities such as scheduling and manual operation. Referring to the example of FIG. 1E, a user associated with entity "ENT1" may be able to perform management actions associated with smart lighting device 602 through lighting management platform 606. For example, lighting management platform 606 may provide a user interface 616 that allows for viewing of device information, status monitoring, and access to any services available for the smart lighting device 602. The user interface 616 may allow for searching, sorting filtering and the like based on device identifiers, devices status, and in this case, fixture identifiers (e.g., "KM501*") and locations (e.g., "Main Campus"). Geographic searching/filtering may also be provided. In some implementations, service platform 115 may facilitate deployment of smart devices by allowing an entity to specify the type of smart device to be deployed, and then causing an automatic procurement of the smart device from a source.

In some embodiments, service platform 115 may provide a facility to allow an entity to automatically procure smart devices as needed, and have the device information automatically provided for provisioning. Such a facility may be useful to avoid management of individual identifiers and simplify the process of obtaining specific types of smart devices that may be applicable to certain installations. FIGS. 1F-1I illustrate an example system with components of an automatic smart device facility. As further shown in FIG. 1F and FIG. 1G, and by reference number 720, service platform 115 may receive, from user device 105 associated with the entity, a request for a type of smart device. For example, service platform 115 may receive the request for a type of smart device based on a user input of a request to obtain the type of smart device. In some implementations, the service platform 115 may receive the request for a type of smart device based on a request submitted through user interface 113, or through an application programming interface (API) 116 provided by service platform 115 and to which user device 105 has programmatic access. The type of smart device may be any smart device that is available for use in system 100 (e.g., a smart lighting device). Other types of smart devices that may be available for selection by user device 105 may include environmental sensors, cameras, traffic monitors, robotic devices, and the like. The types of smart devices may be delineated into further types within each broad classification. For example, a type of smart lighting device may include any type of lighting component, fixture, and/or the like that can be automatically controlled, managed, observed, and/or the like over a network (e.g., the Internet, the Internet of Things (IoT), and/or the like). In some implementations, the type of smart lighting may include smart lights that are indoor or outdoor lights, fixed or freestanding lights, home or office lights, vehicle lights, task lights, ceiling lights, wall lights, lit signage, track lights, bay lights, strip lights, accent lights, light pole lights, street lights, traffic lights, yard lights, decorative lights, theatrical lights, security lights, safety lights, lighthouse lights, dock lights, pool lights, and/or the like. The request from the user device 105 indicating a type of smart device may include a request identifier to allow the receipt of the request to be tracked by service platform 115.

Figure 1H:
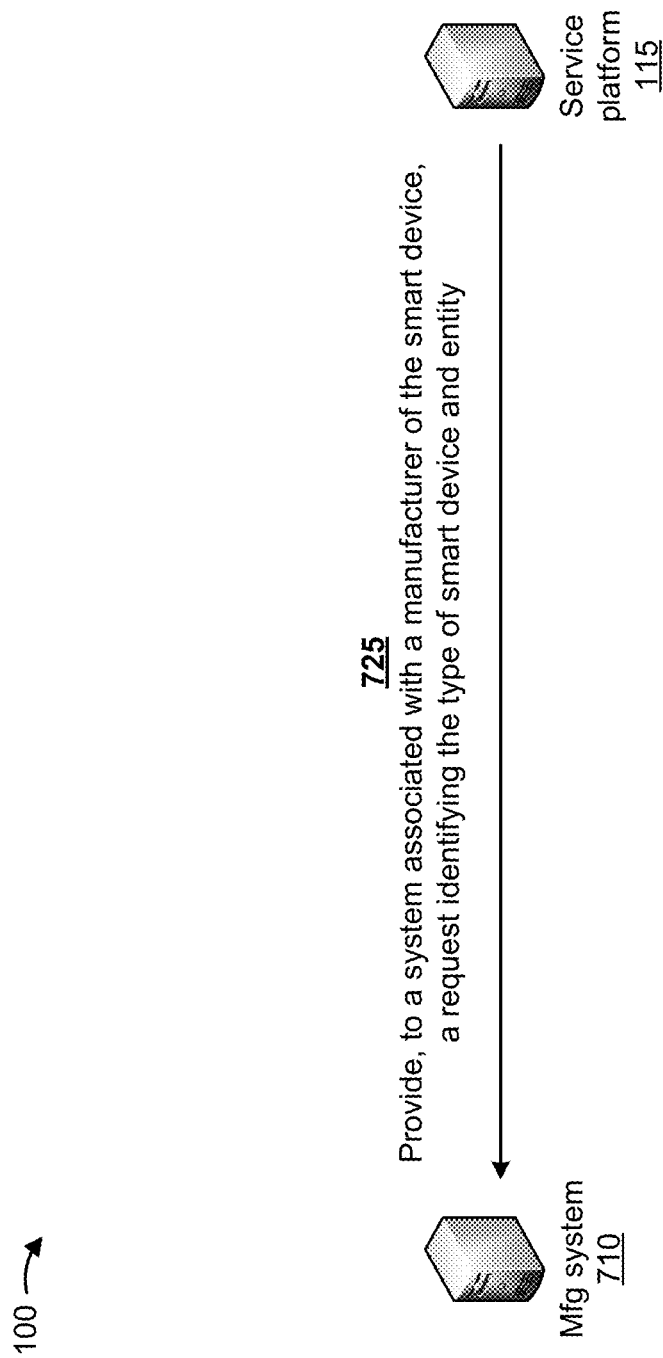

As shown in FIG. 1H, and by reference number 725, service platform 115 may provide, to a system 710 associated with a manufacturer of smart devices, a request for the type(s) of smart device(s) requested by the entity. The request may include information identifying the type(s) of smart device(s) being requested, the quantities requested, information related to the entity, as well as other information that may be useful to fulfill the request. In some implementations, service platform 115 may provide the request automatically, for example, by way of an API 117 that allows for the submission of the request to system 710. System 710 may be directly associated with the manufacturer; may be associated with a vendor or seller designated by the manufacturer; may be associated with a vendor or seller selected by the service platform 115 based on the type of smart device, the entity, and/or the like; may be associated with a value-added reseller or original equipment manufacturer; and/or the like. Likewise, service platform 115 may be communicatively connected to more than one system 710, and may make requests to individual systems 710 depending on the type of smart devices requested by the entity (e.g., where a first system 710 is associated with a manufacturer of a first type of smart device being requested and a second system 710 is associated with a second type of smart device being requested). The request to system 710 may include a request identifier that may be used to allow service platform 115 to track the request and future responses to the request. In the illustrated example, a request may indicate a request for smart lighting devices.

In some implementations, the entity may utilize user device 105 to request the type(s) of smart device(s) directly through system 710 associated with the manufacturer of the type(s) of smart device(s), instead of through service platform 115. In such cases, the request may include identifying information for the provider of service platform 115, such that system 710 is able to communicate with service platform 115, as described below.

Figure 1I:
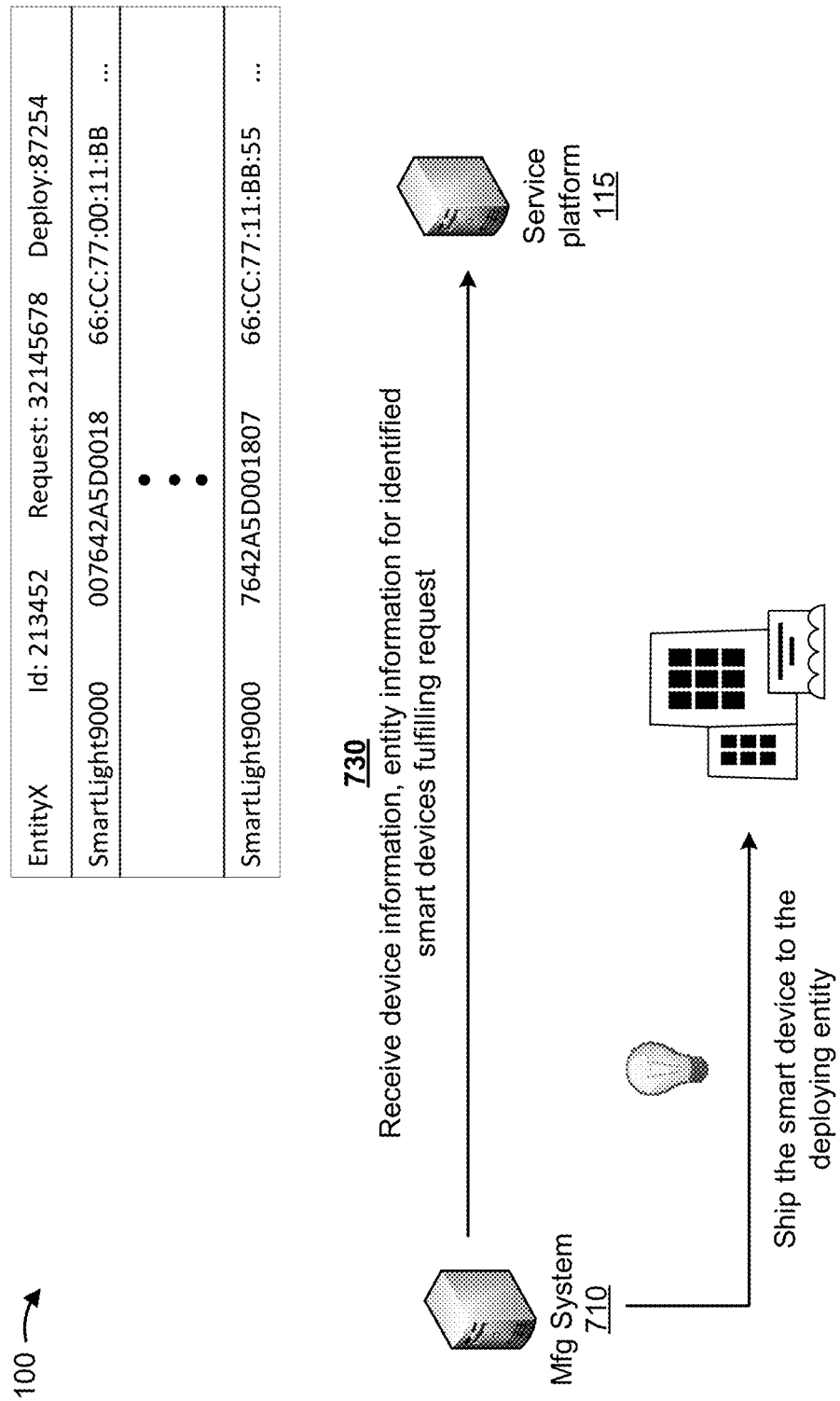

As shown in FIG. 1I, and by reference number 730, service platform 115 may receive, from system 710 associated with the manufacturer of the smart device, device information related to the smart device(s) requested by the entity. For example, system 710 may provide the device information once the manufacturer of the requested smart device(s) has identified specific devices that it will use to fulfill the request. The device information may include an identifier of the type of smart device being provided, one or more smart device identifiers associated with each smart device being provided (e.g., serial numbers, IMEIs, MAC addresses), and the like. In some implementations, entity information may be provided with the device information, such as one or more entity identifiers (e.g., an account number), and/or one or more identifiers of the smart device deployment. In some implementations, system 710 associated with the smart device manufacturer may indicate whether the smart devices identified to fulfill the request have been shipped to and/or received by the entity. In some implementations, the message from the system 710 may include the request identifying information of the request for which the message is intending to be a response. In the example illustrated in FIG. 1I, system 710 has provided device information associated with smart lighting devices 196, each of which has associated device information, including one or more device identifiers that uniquely identify each smart lighting device 196. In some implementations, service platform 115 may send a message to user device 105 indicating that device information has been received associated with the request 720 by user device 105. Service platform 115 may then provide the device information and entity information to network control platform 190 such as described above.

In this way, several different stages of the process for provisioning different types of smart devices are automated, which may remove human subjectivity and waste from the process, and which may improve speed and efficiency of the process and conserve computing resources (e.g., processing resources, memory resources, and/or the like), communication resources, networking resources, and/or the like. Furthermore, implementations described herein use a rigorous, computerized process to perform tasks or roles that were not previously performed or were previously performed using subjective human intuition or input. For example, currently there does not exist a technique that automatically provisions different types of smart devices. Finally, the process for automatically provisioning different types of smart devices conserves computing resources, communication resources, networking resources, and/or the like that would otherwise be wasted in manually inputting smart device identifiers into multiple systems, identifying and correcting incorrectly input smart device identifiers, configuring services for different types of smart devices, and/or the like.

As indicated above, FIGS. 1A-1I are provided merely as examples. Other examples may differ from what was described with regard to FIGS. 1A-1I. The number and arrangement of devices and networks shown in FIGS. 1A-1I are provided as an example. In practice, there may be additional devices and/or networks, fewer devices and/or networks, different devices and/or networks, or differently arranged devices and/or networks than those shown in FIGS. 1A-1I. Furthermore, two or more devices shown in FIGS. 1A-1I may be implemented within a single device, or a single device shown in FIGS. 1A-1I may be implemented as multiple, distributed devices. Additionally, or alternatively, a set of devices (e.g., one or more devices) of FIGS. 1A-1I may perform one or more functions described as being performed by another set of devices of FIGS. 1A-1I.

Figure 2:
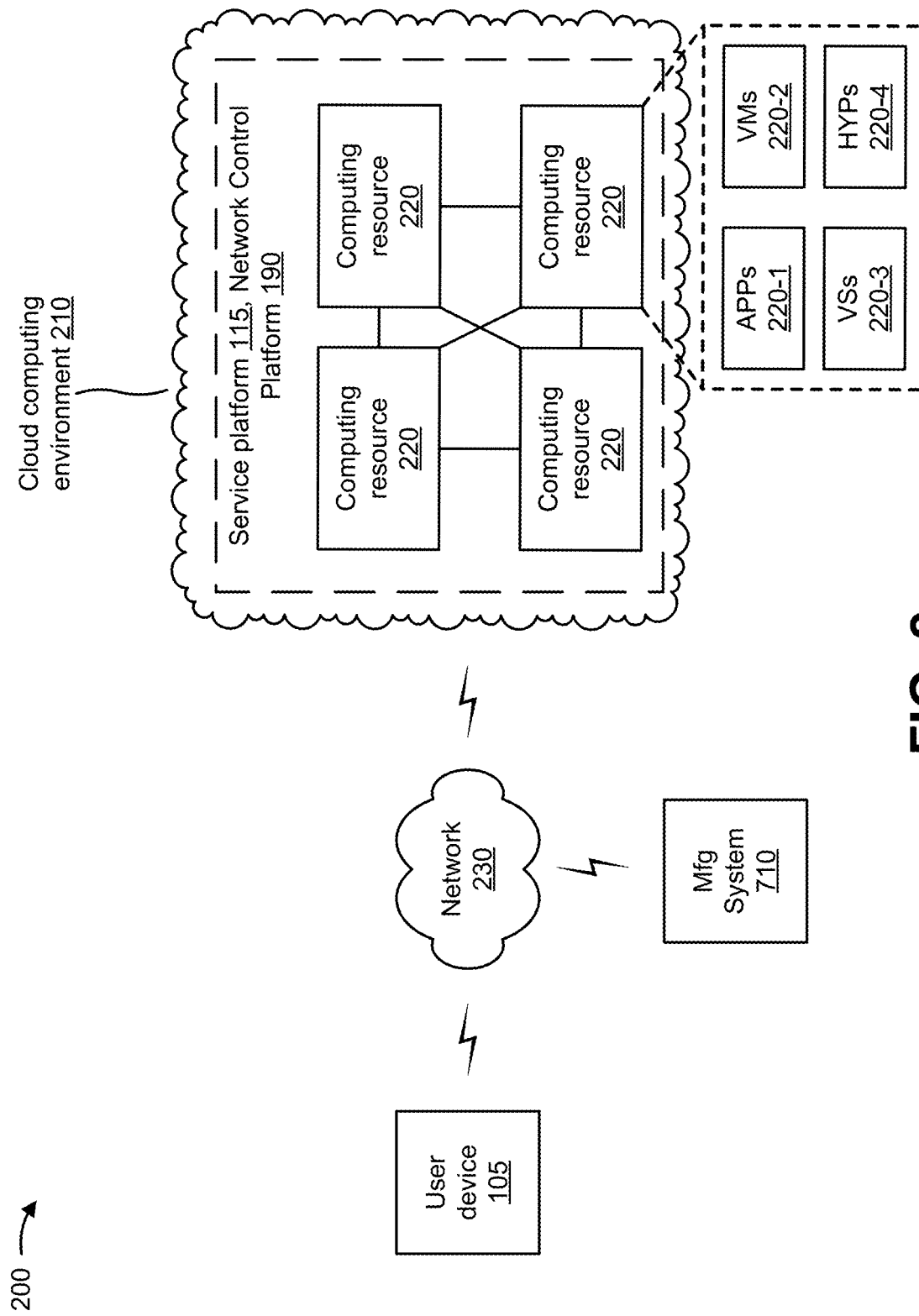
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user device 105, manufacturer system 710, service platform 115, network control platform 190 and a network 230. Devices of environment 200 may interconnect via wired connections, wireless connections, or a combination of wired and wireless connections.

User device 105 includes one or more devices capable of receiving, generating, storing, processing, and/or providing information, such as information described herein. For example, user device 105 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.) or a similar type of device. In some implementations, user device 105 may receive information from and/or transmit information to manufacturer's system 710 and/or service platform 115.

Manufacturer system 710 includes one or more devices capable of receiving, generating, storing, processing, and/or providing information, such as information described herein. In some implementations, system 710 may be hosted in a cloud computing environment, may not be cloud-based (i.e., may be implemented outside of a cloud computing environment), may be partially cloud-based, and/or the like. In some implementations, system 710 may receive information from and/or transmit information to user devices 105 and/or service platform 115.

Service platform 115 includes one or more devices that automatically provision different types of smart devices. In some implementations, service platform 115 may be designed to be modular such that certain software components may be swapped in or out depending on a particular need. As such, service platform 115 may be easily and/or quickly reconfigured for different uses. In some implementations, service platform 115 may receive information from and/or transmit information to one or more user devices 105 and/or manufacturer system 710.

Network control platform 190 includes one or more devices that automatically provision different types of smart devices. In some implementations, network control platform 190 may be comprised of multiple software and/or hardware components. For example, network control platform may include a network management platform 192 and/or a device management platform 194, which themselves may be comprised of multiple hardware and/or software components. In some implementations, network control platform may receive information from and/or provide information to service platform 115.

In some implementations, as shown, service platform 115 and/or network control platform 190 may be hosted in a cloud computing environment 210. Notably, while implementations described herein describe service platform 115 and/or network control platform 190 as being hosted in cloud computing environment 210, in some implementations, all or portions of service platform 115 and/or network control platform 190 may not be cloud-based (i.e., may be implemented outside of a cloud computing environment) or may be partially cloud-based. For example, portions of network control platform 190 may be implemented in specialized hardware for network control and transport.

Cloud computing environment 210 includes an environment that may host some or all of service platform 115 and/or network control platform 190. Cloud computing environment 210 may provide computation, software, data access, storage, etc., services that do not require end-user knowledge of a physical location and configuration of system(s) and/or device(s) that hosts service platform 115 and/or network control platform 190. As shown, cloud computing environment 210 may include a group of computing resources 220 (referred to collectively as "computing resources 220" and individually as "computing resource 220").

Computing resource 220 includes one or more personal computers, workstation computers, mainframe devices, or other types of computation and/or communication devices. In some implementations, computing resource 220 may host service platform 115 and/or network control platform 190. The cloud resources may include compute instances executing in computing resource 220, storage devices provided in computing resource 220, data transfer devices provided by computing resource 220, etc. In some implementations, computing resource 220 may communicate with other computing resources 220 via wired connections, wireless connections, or a combination of wired and wireless connections.

As further shown in FIG. 2, computing resource 220 includes a group of cloud resources, such as one or more applications ("APPs") 220-1, one or more virtual machines ("VMs") 220-2, virtualized storage ("VSs") 220-3, one or more hypervisors ("HYPs") 220-4, and/or the like.

Application 220-1 includes one or more software applications that may be provided to or accessed by user device 105. Application 220-1 may eliminate a need to install and execute the software applications on user device 105. For example, application 220-1 may include software associated with service platform 115 and/or any other software capable of being provided via cloud computing environment 210. In some implementations, one application 220-1 may send/receive information to/from one or more other applications 220-1, via virtual machine 220-2.

Virtual machine 220-2 includes a software implementation of a machine (e.g., a computer) that executes programs like a physical machine. Virtual machine 220-2 may be either a system virtual machine or a process virtual machine, depending upon use and degree of correspondence to any real machine by virtual machine 220-2. A system virtual machine may provide a complete system platform that supports execution of a complete operating system ("OS"). A process virtual machine may execute a single program and may support a single process. In some implementations, virtual machine 220-2 may execute on behalf of a user (e.g., a user of user device 105 or an operator of service platform 115), and may manage infrastructure of cloud computing environment 210, such as data management, synchronization, or long-duration data transfers.

Virtualized storage 220-3 includes one or more storage systems and/or one or more devices that use virtualization techniques within the storage systems or devices of computing resource 220. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 220-4 may provide hardware virtualization techniques that allow multiple operating systems (e.g., "guest operating systems") to execute concurrently on a host computer, such as computing resource 220. Hypervisor 220-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
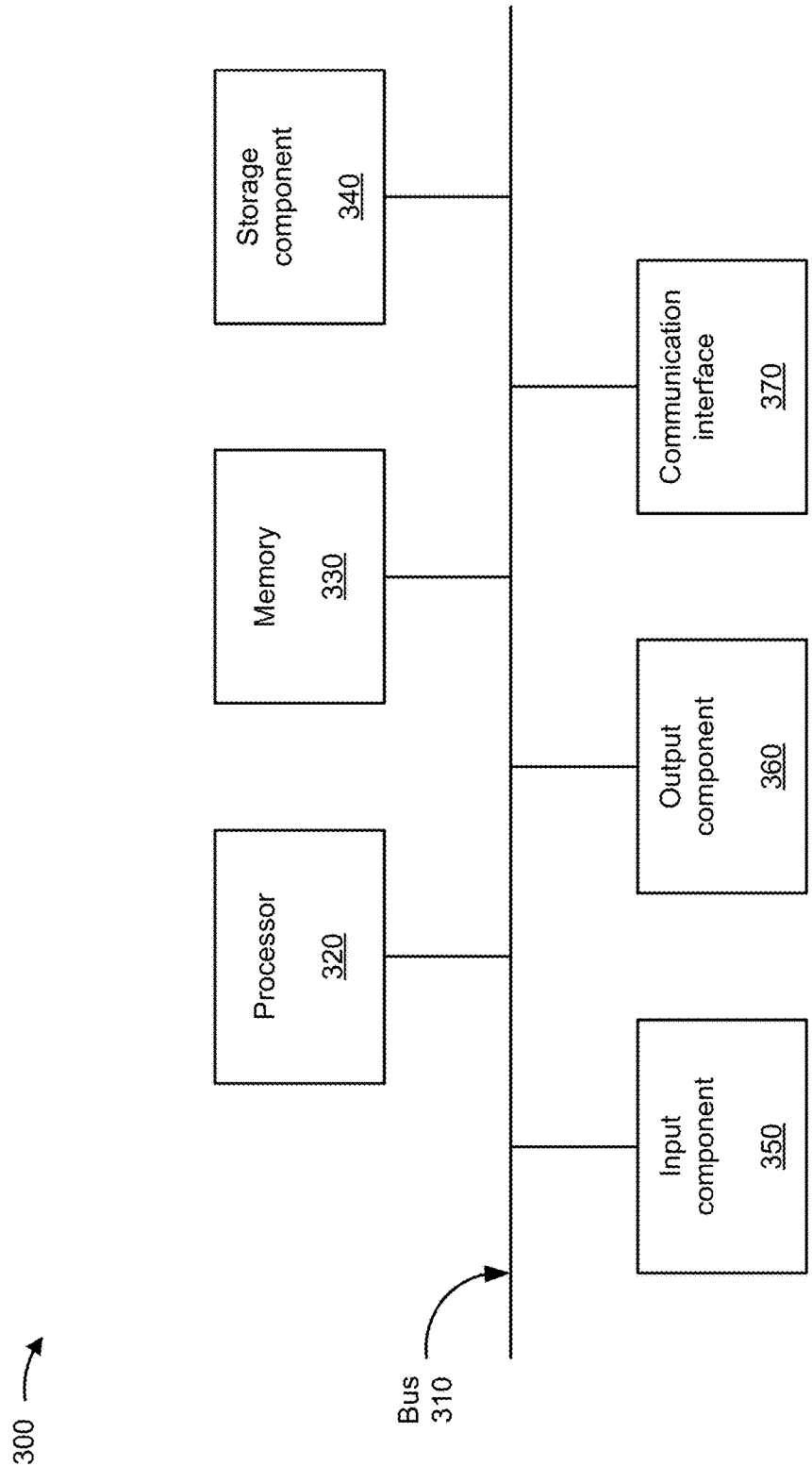
FIG. 3 is a diagram of example components of one or more devices of FIG. 2.

FIG. 3 is a diagram of example components of a device 300. Device 300 may correspond to user device 105, manufacturer system 710, service platform 115, network control platform 190 and/or computing resource 220. In some implementations, user device 105, manufacturer system 710, service platform 115, network control platform 190 and/or computing resource 220 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
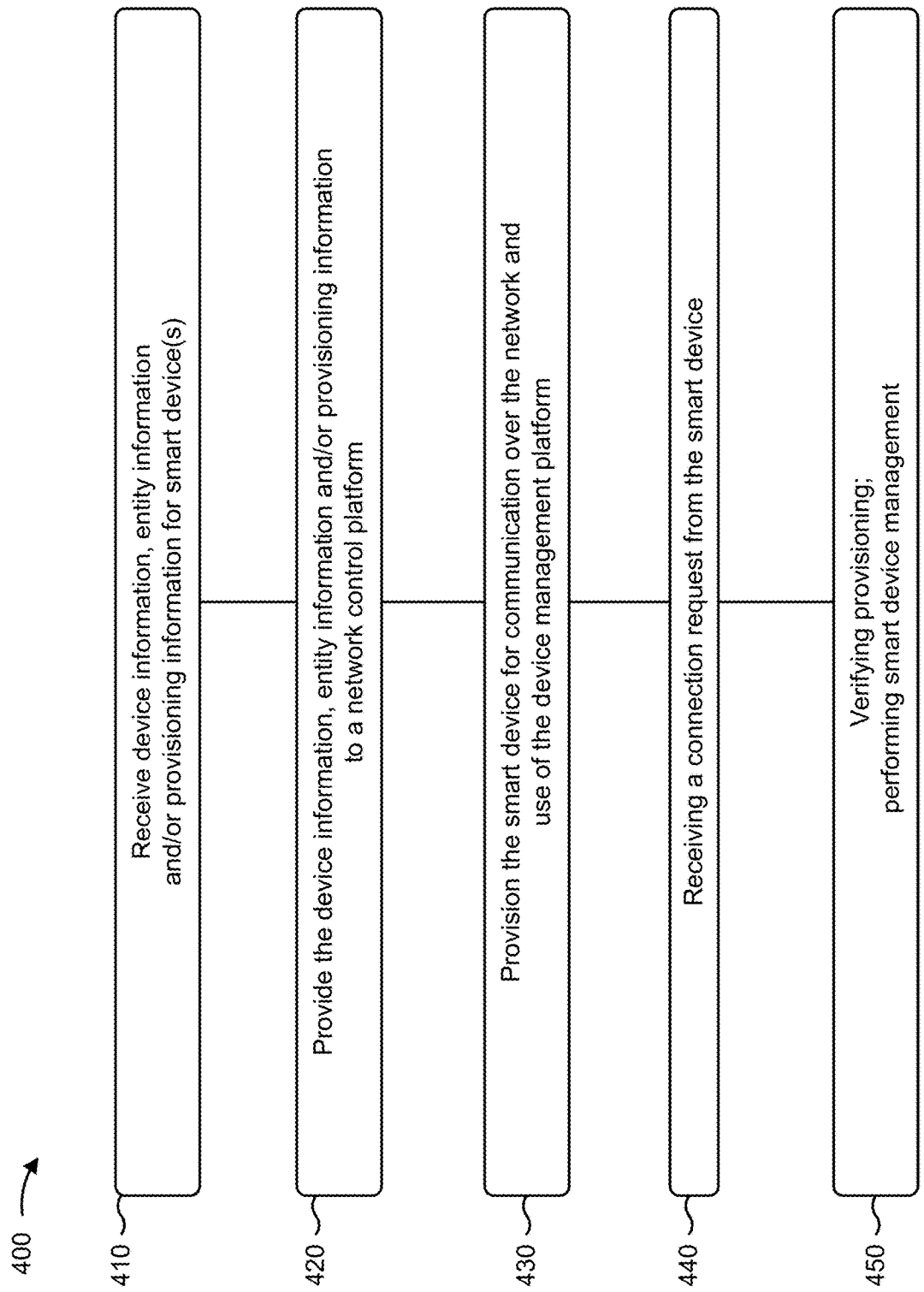
FIG. 4 is a flow chart of an example process for automatically provisioning smart devices.

FIG. 4 is a flow chart of an example process 400 for automatically provisioning different types of smart devices. In some implementations, one or more process blocks of FIG. 4 may be performed by a device (e.g., service platform 115, network control platform 190). In some implementations, one or more process blocks of FIG. 4 may be performed by another device or a group of devices separate from or including the device, such as a user device (e.g., user device 105).

As shown in FIG. 4, process 400 may include receiving device information, entity information and/or provisioning information associated with one or more smart devices (block 410). For example, as noted above, in some implementations, a service platform 115 (e.g., using computing resource 220, processor 320, communication interface 370, and/or the like) may receive, from a user device, a request for a type of smart device (such as a smart lighting device), and a request for the type of smart device may be provided to a system associated with a manufacturer of the smart device. The request may include data identifying the type of smart device requested and data identifying the entity requesting the smart device. The system associated with the manufacturer of the smart device may provide device information for the smart device and entity information associated with the entity, and in some implementations, the device information and the entity information may be received when the manufacturer ships the smart device to the requesting entity. In some implementations, an entity associated with the smart devices may provide the device information, entity information and/or provisioning information directly to service platform 115, for example, through a user interface. In some implementations, provisioning information includes geographic location data for a desired location for the smart device.

As further shown in FIG. 4, process 400 may include providing from the service platform 115 to a network control platform 190 the device information, the entity information and/or the provisioning information (block 420). For example, the service platform 115 (e.g., using computing resource 220, processor 320, memory 330, communication interface 370, and/or the like) may provide to network control platform 190 the device information including at least one device identifier and the entity information including at least one entity identifier, as described above. The service platform 115 may also provide provisioning information to network control platform 190.

As further shown in FIG. 4, process 400 may include provisioning the smart device(s) for communication over a network and use of services of a device management platform (block 430). For example, the network control platform 190 (e.g., using computing resource 220, processor 320, memory 330, storage component 340, communication interface 370, and/or the like) may perform provisioning activities—for example, through multiple components of network platform 190, such as a network management platform 192 and a device management platform 194—to enable the smart device(s) to communicate over network 195 and use the services of device management platform 194, as described above. Provisioning activities may include storing the device identifier in network device data stores accessible to network management platform 192 to allow network registration, storing the device identifier in a device management data store that is accessible to data management platform 194 to allow services to be provided by device management platform 194. Provisioning in the device management platform 194 may include associating the smart device with the entity, for example, based on the entity information, and determining services that are available to the smart device. The services provisioned for the smart device may be based on the type of smart device, the entity and the subscribed services. Provisioning activities may also include providing a device management network address for a network interface facility that provides connectivity to device management platform 194. Provisioning activities may also include setting desired geographic location data for the smart device(s).

As further shown in FIG. 4, process 400 may include receiving a connection request from a smart device (block 440). For example, the network control platform 190 (e.g., using computing resource 220, processor 320, communication interface 370, and/or the like) may receive from the smart device a request to connect to network 195 and device management platform 194, as described above. The request may include a device identifier of the smart device, and in some implementations may include a network address of the device management platform 194.

As further shown in FIG. 4, process 400 may include verifying the provisioning of the smart device(s) and engaging in smart device management activities (block 450). For example, the device (e.g., using computing resource 220, processor 320, memory 330, storage component 340, and/or the like) may confirm the provisioning of smart devices (e.g., by verifying device identifiers, geographic information, etc.), and the device management platform may thereafter allow services to the smart devices, as described above. The device management platform 194 may communicate management messages to the smart device after determining that the device is provisioned, including configuration commands and data requests.

Process 400 may include additional implementations, such as any single implementation or any combination of implementations described below and/or in connection with one or more other processes described elsewhere herein.

In some implementations, process 400 may include obtaining location information for the smart device and providing the location information to the device management platform 194, as described above. Process 400 may additionally include associating the smart device with fixture data for a fixture in a geographic area of the smart device, as described above. Process 400 may additionally include verifying that the smart device is in a correct location by comparing the location information to geographic information provided during provisioning, as described above.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   provisioning a smart device in a network management platform and a device management platform to allow the smart device to communicate using a network and use at least one service of the device management platform, the provisioning including:
   storing a device identifier of the smart device in a network management data store accessible to the network management platform, the device identifier based on device information,
   storing the device identifier of the smart device in a device management platform data store accessible to the device management platform,
   providing the smart device with a device management network address to establish a communication path with the smart device and the device management platform, the device management network address being a network address associated with a network interface facility providing access to the device management platform and distinct from the device identifier, and
   associating the device identifier with entity account information,
   wherein the entity account information includes information identifying service subscriptions;
   receiving a first message from the smart device, the first message including the device identifier;
   determining that the smart device may communicate over the network based on the device identifier;
   receiving a second message from the smart device, the second message including the device identifier and the device management network address;
   providing the second message to the device management platform using the network interface facility;
   determining that the smart device is to be provided the at least one service based on the device identifier and the entity account information; and
   providing the at least one service to the smart device from the device management platform.

2. The method of claim 1, wherein the at least one service is one of requesting device configuration data, providing device configuration data, requesting device operational data, or activating a device capability.

3. The method of claim 1, wherein provisioning the smart device further includes
   associating the smart device with an entity in the device management platform based on entity information, and
   determining that the at least one service is applicable to the smart device based on association with the entity.

4. The method of claim 1, further comprising:
   receiving location information for the smart device, the location information reflecting a current location of the smart device; and
   performing an action by the device management platform based on the location information, the action comprising one of:
   (a) validating that the smart device is in a desired location, by comparing the location information to previously provided expected smart device location information, and not providing the at least one service when the location information does not geographically correspond to the previously provided expected smart device location information, or
   (b) associating the smart device with a fixture, the fixture having fixture location information that geographically corresponds to the location information.

5. The method of claim 1, wherein the device management network address is a Short Messaging Service (SMS) address, and the network interface facility includes an SMS gateway.

6. The method of claim 1, wherein the device management network address is an Internet Protocol (IP) address, and the network interface facility includes a packet gateway.

7. The method of claim 1, wherein provisioning the smart device further includes one of:
   (a) (1) providing the device information and entity information to the device management platform, and (2) providing by the device management platform the device information to the network management platform; or (b) (1) providing the device information and the entity information to the network management platform, and (2) providing by the network management platform the device information and the entity information to the device management platform.

8. The method of claim 1, wherein the smart device is a smart lighting device, and the at least one service includes activating a light source of the smart lighting device.

9. The method of claim 1, further comprising:
receiving a first request for a type of smart device from a user device associated with an entity;
providing a second request to a system associated with a manufacturer of the smart device, the second request including information identifying the type of smart device and entity information associated with the entity; and
in response to the second request, receiving a notification message from the system, the notification message including the device information associated with the smart device.

10. A non-transitory computer readable medium storing instructions that, when the instructions are processed by a processor, cause the processor to perform the process of claim 1.

11. The method of claim 1, wherein the device identifier includes one or more of:
an international mobile equipment identity (IMEI) number,
a serial number,
a media access control (MAC) address,
a model number, or
a version number.

12. A system, comprising:
a network control platform including a network management component, a device management component, and a network interface facility, wherein the network control platform is configured to:
provision a smart device in the network control platform to allow the smart device to communicate using a network, the provisioning including:
storing a device identifier of the smart device in a network management data store accessible to the network control platform, the device identifier based on device information,
providing the smart device with a device management network address to establish a communication path with the smart device and the device management component, the device management network address being a network address associated with the network interface facility providing access to the device management component and distinct from the device identifier, and
associating the device identifier with entity account information;
provision the smart device in the device management component to allow the smart device to use at least one service of the device management component, the provisioning including:
storing the device identifier of the smart device in a device management component data store accessible to the device management component; and
wherein the network control platform is further configured to:

receive a first message from the smart device, the first message including the device identifier,
determine that the smart device may communicate over the network based on the device identifier,
receive a second message from the smart device, the second message including the device identifier and the device management network address,
provide the second message to the device management component using the network interface facility,
determine that the smart device is to be provided the at least one service based on the device identifier and the entity account information, and
provide the at least one service to the smart device from the device management component.

13. The system of claim 12, wherein the smart device is a smart lighting device, and the at least one service includes activating a light source, detecting an outage, or requesting power consumption data.

14. The system of claim 13, further comprising a service platform communicatively coupled to the network control platform, wherein the service platform is configured to:
receive a first request for a type of smart device from a user device associated with an entity,
provide a second request to a system associated with a manufacturer of the smart device, the second request including information identifying the type of smart device and entity information associated with the entity,
in response to the second request, receive a notification message from the system, the notification message including the device information associated with the smart device, and
provide the device information and the entity information to the network control platform.

15. The system of claim 12, wherein the at least one service is one of requesting device configuration data, providing device configuration data, requesting device operational data, or activating a device capability.

16. The system of claim 12, wherein provisioning the smart device in the device management component further includes:
associating the smart device with an entity in the device management component based on entity information, and
determining that the at least one service is applicable to the smart device based on association with the entity.

17. The system of claim 12, wherein the network control platform is further configured to:
receive location information for the smart device, the location information reflecting a current location of the smart device; and
perform an action by the device management component based on the location information, the action comprising one of:
validating that the smart device is in a desired location, by comparing the location information to previously provided expected smart device location information, and not providing the at least one service when the location information does not geographically correspond to the previously provided expected smart device location information, or
associating the smart device with a fixture, the fixture having fixture location information that geographically corresponds to the location information.

18. The system of claim 12, wherein the device management network address is a Short Messaging Service (SMS) address, and the network interface facility includes an SMS gateway.

19. The system of claim 12, wherein the device management network address is an Internet Protocol (IP) address, and the network interface facility includes a packet gateway.

20. The system of claim 12, wherein the network control platform is further configured to one of:
- (a) (1) provide the device information and entity information to the device management component, and
  (2) provide by the device management component the device information to the network control platform; or
- (b) (1) provide the device information and the entity information to the network control platform, and
  (2) provide by the network control platform the device information and the entity information to the device management component.

\* \* \* \* \*